United States Patent
Kelley

[11] Patent Number: 5,883,745
[45] Date of Patent: Mar. 16, 1999

[54] MIRROR ASSEMBLY AND METHOD

[75] Inventor: Donna Kelley, San Jose, Calif.

[73] Assignee: Polycom, Inc., San Jose, Calif.

[21] Appl. No.: 885,489

[22] Filed: Jun. 30, 1997

[51] Int. Cl.$^6$ .......................... G02B 27/10; G02B 17/00
[52] U.S. Cl. .......................................... 359/618; 359/728
[58] Field of Search ................................ 359/618, 727, 359/728, 811, 819, 840, 900, 629

[56] References Cited

U.S. PATENT DOCUMENTS

| | | | |
|---|---|---|---|
| 3,848,122 | 11/1974 | Hutchinson, III | 240/46.51 |
| 4,163,150 | 7/1979 | Stankewitz | 250/205 |
| 4,386,830 | 6/1983 | Stankewitz et al. | 350/524 |
| 4,682,885 | 7/1987 | Torigoe | 355/67 |
| 4,865,431 | 9/1989 | Ueda | 350/427 |
| 4,909,615 | 3/1990 | Ueda | 350/427 |
| 4,924,082 | 5/1990 | Opheij et al. | 250/216 |
| 5,198,916 | 3/1993 | Kim | 359/15 |
| 5,406,461 | 4/1995 | Amann | 362/20 |
| 5,548,373 | 8/1996 | Ueda | 355/55 |

*Primary Examiner*—Georgia Epps
*Assistant Examiner*—Ricky Mack
*Attorney, Agent, or Firm*—Carr & Ferrell LLP

[57] ABSTRACT

A condenser or aspheric lens comprising a condenser body having an aspheric section with a dome-shaped surface terminating in a circumferential perimeter and a sloping condenser surface extending from the circumferential perimeter outwardly and away from the aspheric section. A mirror assembly having a housing, an outer mirror assembly supported by the housing, and an inner mirror engaged to the outer mirror assembly. A method for capturing peripheral light rays from a light source. After a light member is illuminated to produce light rays, a portion of the light rays pass directly through the aspheric section of the condenser and a portion of the light rays are reflected off of an inner concave mirror surface for passage through the aspheric section of the condenser. A remaining portion of the light rays are reflected off of an outer peripheral mirror for passage through the condenser, preferably through a sloping condenser surface of the condenser.

6 Claims, 10 Drawing Sheets

MIRROR ASSEMBLY AND METHOD

BACKGROUND OF THE INVENTION

1. Field of the Invention

This invention is related to a Köhler illumination. More specifically, the present invention provides a mirror assembly and method for producing an improved Köhler illumination.

2. Description of the Prior Art

Köhler illumination has frequently been used in a projecting optical system since it has conventionally given an image having a uniform illumination intensity. One example of such projecting optical system employing Köhler illumination system is a system for projecting images in an overhead projector.

An overhead projector includes a concave mirror, an illumination device as a light source, and an aspheric lens or a condenser. The aspheric lens or condenser is designed to have a much shorter focal length than is possible with a spherical glass lens of equal diameter and equal spherical aberration. It has one aspheric surface only, the other surface being either plano, spherical convex, or spherical concave. A correctly formed aspheric lens surface exactly cancels the spherical aberration that would otherwise be present in an optical system, or reduces both spherical aberration and coma to insignificance, in which case the system is conventional said to be aplanatic. Thus and as is well known, more energy can be concentrated into a small area, such as the entrance pupil of a projection lens system, or the sensitive area of a detector, than would otherwise be possible. Without the aspheric surface, marginal rays (which enter or exit the lens near its edge) may be severely aberrated and fail to contribute to the illumination of the desired target. The aspheric surface puts marginal rays on-target, and allows the potential collecting area of the system to be fully utilized. However, not all rays produced by the light source are reflected by the concave mirror for passage through the condenser. A substantial amount of light rays from the light source by-pass the concave mirror and are lost as is illustrated in the following U.S. patents which were discovered in the patentability investigation:

U.S. Pat. No. 3,848,122—titled: ADJUSTABLE LIGHT DIFFUSER FOR AN OPTICAL PROJECTION SYSTEM, Hutchison, III U.S. Pat. No. 4,163,150—titled: PROCESS AND APPARATUS FOR AUTOMATICALLY REALIZING KÖHLER'S PRINCIPLE OF ILLUMINATION, Stankewitz U.S. PAT. No. 4,386,830—titled: INCIDENT LIGHT, BRIGHT-FIELD KÖHLER ILLUMINATING DEVICE, Stankewitz et al U.S. Pat. No. 4,865,431—titled: ZOOM LENS SYSTEM FOR USE IN AN IMAGE PROJECTING APPARATUS WITH KÖHLER ILLUMINATION, Ueda U.S. Pat. No. 4,909,615—titled: ZOOM LENS SYSTEM FOR USE IN AN IMAGE PROJECTING APPARATUS WITH KUM. / 0 /HLER ILLUMINATION, Ueda U.S. Pat. No. 5,548,373—titled: IMAGE READING APPARATUS, Ueda U.S. Pat. No. 3,848,122 to Hutchison, III, teaches an adjustable light diffuser for an optical projection system. The diffuser is disclosed as comprising a support frame which supports a plurality of thin metallic wires which are partly suspended from frame. The plurality of metallic wires forms a spider web-like support means for adjustable screens which are similar to house hold screens.

U.S. Pat. No. 4,163,150 to Stankewitz discloses a process and apparatus for automatically realizing Köhler's principle of illumination in microscopes having a variable magnification system as well as an illumination system. FIG. 1 in this patent illustrates illumination in accordance of the Köhler principles wherein a source of light is reproduced by a collector condenser represented by a lens in an intermediate image plane and imaged by way of a mirror and optical system in a focal plane of a condenser assembly which consist of lenses and. In order to adjust the amount of light and the beam path within the entire optical system, a variable diaphragm is provided as best shown in FIG. 1. The diaphragm is arranged for adjusting the aperture and is placed in the focal plane of the condenser assembly or in the intermediate image of plane.

U.S. Pat. No. 4,386,830 to Stankewitz et al teaches an incident light, bright-field Köhler illuminating device for microscopes which reflect an illuminating beam into one half of the pupil of a microscope objective. The illuminating device comprises a diaphragm, a variable aperture diaphragm which is displaceable perpendicular to the optical axis, a condenser lens, a deflecting mirror, a polarizing filter, a field lens, and a beam deflecting optical element.

U.S. Pat. No. 4,909,615 to Ueda teaches a zoom lens system for use in an image projecting apparatus with the Köhler illumination. The beam lens system is taught as a comprising a first lens group and a second lens group. Both the first lens group and the second lens group are movable along an optical axis for zooming. An aperture stop is disposed between the first and second lens groups and. The aperture stop may be independently moved alone the optical axis so is to make the pupil position at the reduction side substantially invariable in an operation of zooming.

U.S. Pat. No. 4,865,431 to Ueda also relates to a zoom lens system for use in image projection apparatus with the Köhler illumination. This patent teaches an aperture stop which is movable relative to the movement of a first lens group and a second lens group in an operation zooming so is to make a pupil position of the zoom lens system at a reduction side invariable.

U.S. Pat. No. 5,548,373 to Ueda teaches an image reading apparatus for reading images recorded on light-transmitting film by means of a linear sensor array. The apparatus comprises an image reader having a plurality of reading elements arrayed in the main scanning direction. The apparatus also includes a light source and condenser elements having power characteristics such that the point of convergence recedes in accordance with the separation of the light rays from an optical access. The apparatus further comprises a projector for projecting a field image illuminated by the light source on the image reader. A drive member is provided for moving the pupil of the projector on an optical axis.

Therefore, what is needed and what has been invented is a system and method for capturing essentially all of the light rays produced by a light source for passage through a condenser or aspheric lens. What is more particularly needed and what has been invented is a mirror assembly including a condenser and method for capturing a substantial amount of light rays from a light source for passage through a condenser or aspheric lens for producing an improved Köhler illumination.

SUMMARY OF THE INVENTION

The present invention accomplishes its desired objects by broadly providing a condenser comprising a condenser body having an aspheric section with a dome-shaped surface terminating in a circumferential perimeter, and a sloping condenser surface extending from the circumferential perimeter outwardly and away from the aspheric section. The dome-shaped surface slopes in a first general direction and the sloping condenser surface extends away from the circumferential perimeter in a second general direction. The sloping condenser surface forms a general saucer-like surface around the aspheric section and terminates in a ridge which lies above the aspheric section. The condenser body includes an integral structure having a cylindrical wall and a bottom with a generally planar surface.

The present invention also accomplishes its desired objects by broadly providing a mirror assembly comprising a housing; an outer mirror assembly supported by the housing; and an inner mirror engaged to the outer mirror assembly. The outer mirror assembly comprises a mirror base having a structure defining an aperture; and at least one peripheral mirror including a mirror bottom and secured to the mirror base. The peripheral mirror may possess any suitable shape, such as hyperbolic, elliptical, asphorical, etc. A plurality of fin members are secured to the mirror bottom of the peripheral (preferably rotatably secured) mirror and depend therefrom. The inner mirror is secured to the mirror base within the aperture and has a mirror body with a structure defining a concave mirror recess. The inner mirror also includes a plurality of fin members secured thereto and depend therefrom. A light assembly is preferably supported by the housing and includes a light member in close proximity to the mirror assembly. The light assembly comprises an adjustable member for adjusting the position of the light member relative to the inner mirror.

The present invention further also accomplishes its desired objects by providing a method for capturing peripheral light rays from a light source comprising the steps:

a) disposing a condenser against a housing supporting a mirror assembly with a light assembly supported by the housing and including a light member;

b) illuminating the light member to produce light rays, a portion of which directly passes through an aspheric section of the condenser without being reflected, leaving a first residual light ray portion and a second residual light ray portion;

c) reflecting the first residual light ray portion for passage through the aspheric section of the condenser; and d) reflecting the second residual light ray portion for passage through the condenser, preferably through a sloping condenser surface of the condenser.

It is therefore an object of the present invention to provide a condenser or aspheric lens.

It is another object of the present invention to provide a mirror assembly.

It is yet another object of the present invention to provide an apparatus for producing and reflecting light for passage through a condenser.

It is further yet another object of the present invention to provide a method for capturing peripheral light rays from a light source.

These, together with the various ancillary objects and features which will become apparent to those skilled in the art as the following description proceeds, are attained by this novel apparatus and method, a preferred embodiment thereof shown with reference to the accompanying drawings, by way of example only, wherein:

DETAILED DESCRIPTION OF THE INVENTION

Referring in detail now to the drawings wherein similar parts of he invention are identified by like reference members, there is seen a mirror assembly, generally illustrated as 10. The mirror assembly 10 may be used in any suitable system where light rays are to be reflected, gathered/captured and refocused. Most preferably, the mirror assembly 10 is employed in a projector machine such as that disclosed U.S. Pat. No. 5,568,279 to Hinman et al, fully incorporated herein by reference thereto as if repeated verbatim immediately hereinafter, and commonly owned by the assignee of the present application.

The mirror assembly 10 comprises a housing 12 with a support frame 14 that supports an outer mirror assembly, generally illustrated as 20. The mirror assembly 10 also comprises an inner mirror, generally illustrated as 24, engaged to the outer mirror assembly 20.

Figure 1:
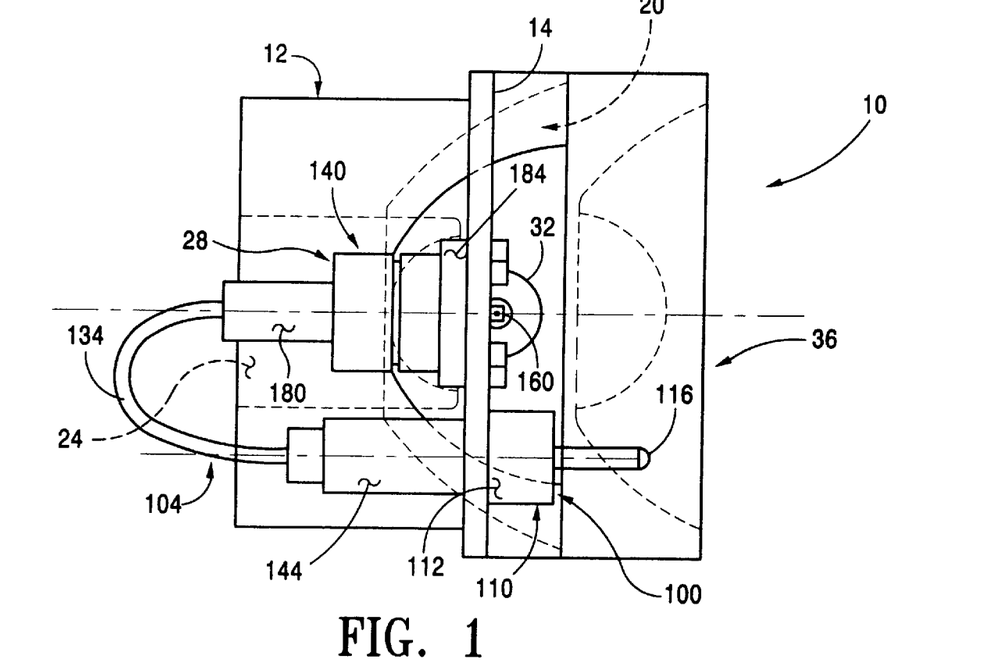
FIG. 1 is a side elevational view of the mirror assembly having a condenser lens flushed thereagainst for gathering and refocusing light rays which have been reflected by the mirror assembly to eventually generally produce a rectangular image, such as in a projector machine.
Figure 2:
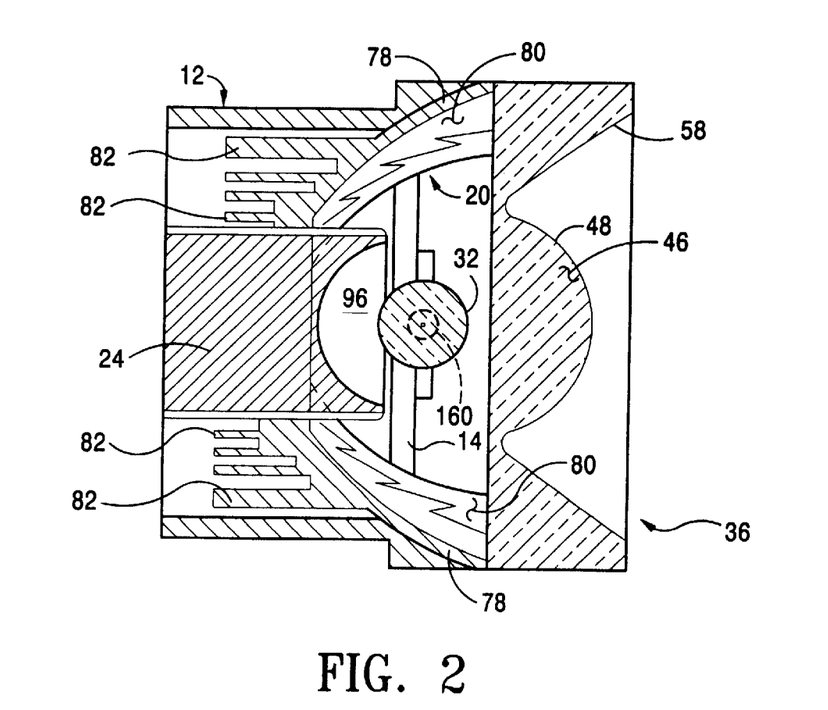
FIG. 2 is a vertical sectional view of the mirror assembly disclosing an outer mirror assembly, an inner mirror threadably engaged to the outer mirror assembly, and the condenser lens mounted against the outer mirror assembly.

A light assembly, generally illustrated as 28, is engaged to and supported by the housing 12. The light assembly 28 includes a light 32 whose position (i.e. distance) relative to the outer mirror assembly 20 and the inner mirror 24 may be adjusted as will be further explained below. A condenser (or aspheric lens), generally illustrated as 36, is disposed against the housing 12 and outer mirror assembly 20 as best shown in FIG. 1.

Figure 6:
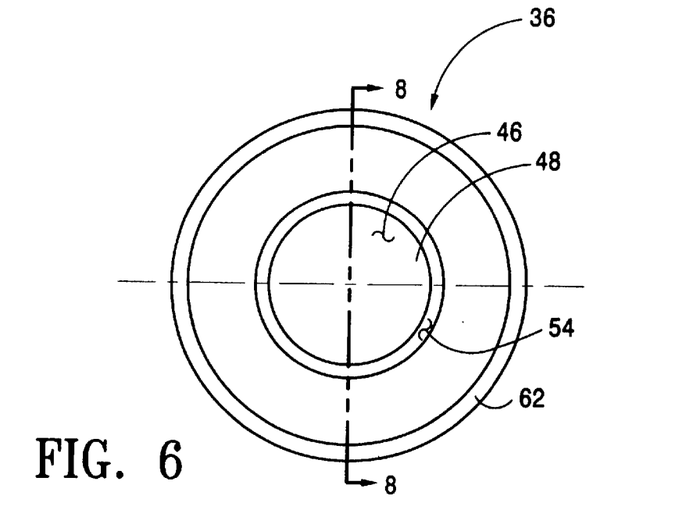
FIG. 6 is a top plan view of the aspheric lens or condenser.
Figure 7:
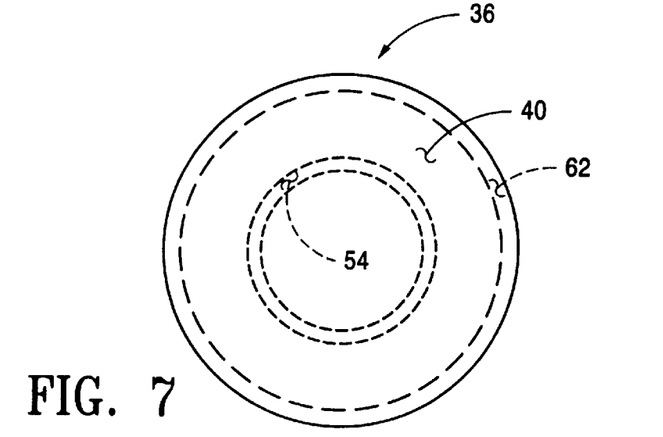
FIG. 7 is a bottom plan view of the condenser of FIG. 6.
Figure 8:
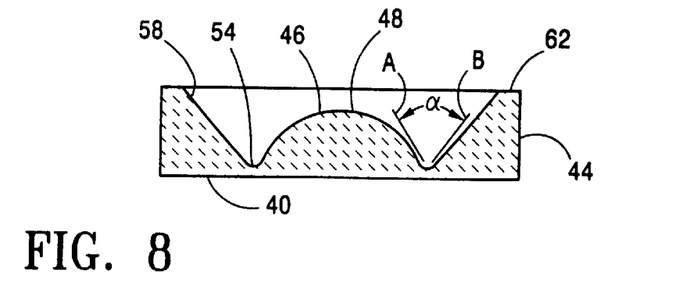
FIG. 8 is a vertical sectional view taken in direction of the arrows and along the plane of line 8—8 in FIG. 6.
Figure 9:
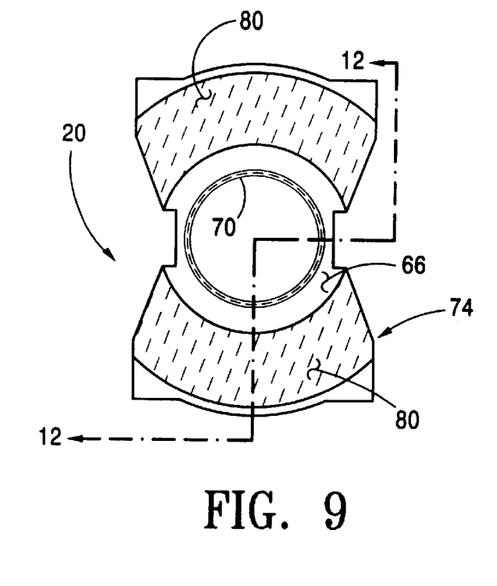
FIG. 9 is a top plan view of the outer mirror assembly.
Figure 10:
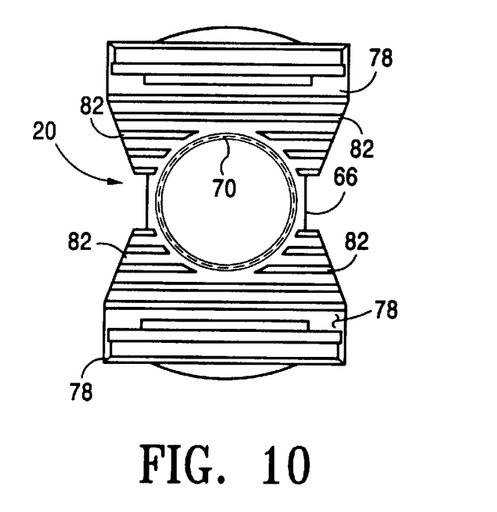
FIG. 10 is a bottom plan view of the outer mirror assembly in FIG. 9.
Figure 11:
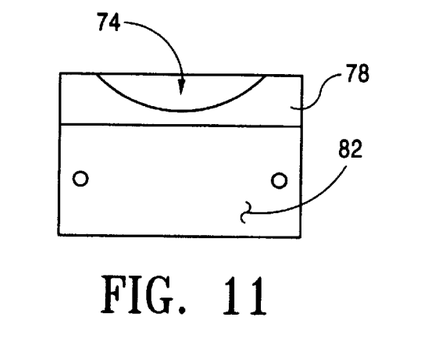
FIG. 11 is an end elevational view of the outer mirror assembly of FIGS. 9 and 10.
Figure 12:
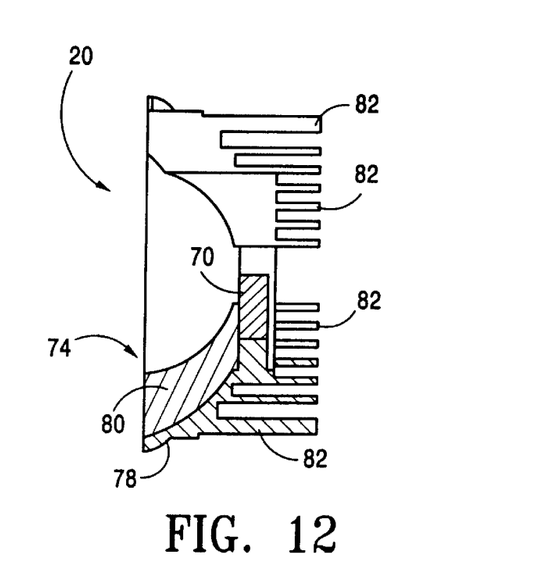
FIG. 12 is a vertical sectional view taken in direction of the arrows and along the plane of the line 12—12 in FIG. 9.
Figure 13:
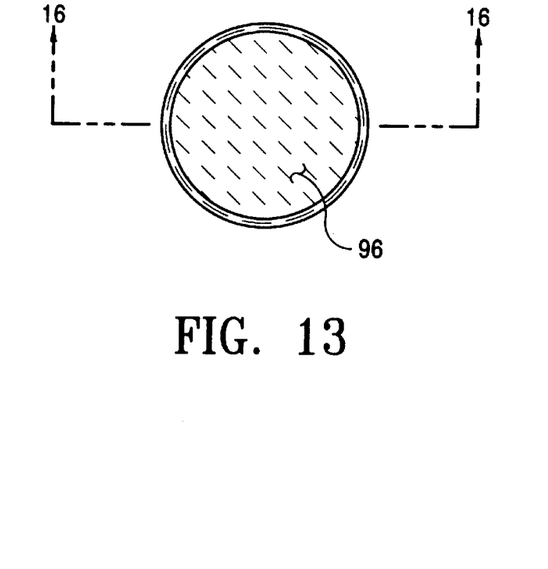
FIG. 13 is a top plan view of the inner mirror.
Figure 14:
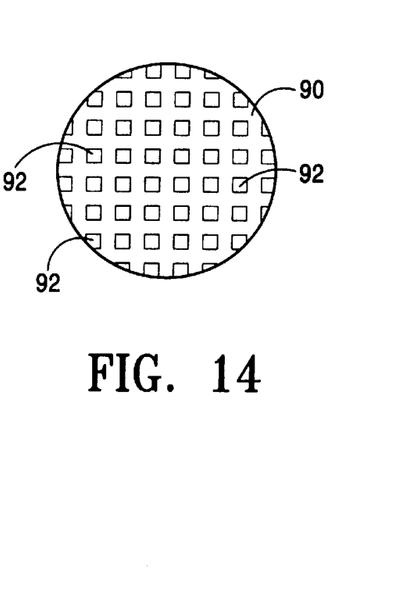
FIG. 14 is a bottom plan view of the inner mirror.

As best shown in FIGS. 6–8, the condenser 36 has a generally cylindrical body possessing an integral structure including a bottom 40 with a generally planar surface and a cylindrical wall 44. The condenser 36 also includes an aspheric section 46 (i.e. a semi-spheroid) having a dome-shaped surface 48 that terminates in a circular or circumferential perimeter 54. A sloping condenser surface 58 extends from the circumferential perimeter 54 outwardly and away from the aspheric section 46. The sloping condenser surface 58 forms a generally saucer-like surface around the aspheric section 46. Stated alternatively, the condenser 36 has the appearance of an ashtray from a top plan view. The dome-shaped surface 48 slopes in one direction, preferably downwardly and towards the circumferential perimeter 54, and the sloping condenser surface 58 slopes in another direction, preferably upwardly and away from the circumferential perimeter 54. A plane A generally along and tangent to any point on the dome-shaped surface 48 and a plane B generally along the sloping condenser surface 58 forms an angel ∝ (see FIG. 8) with respect to each other.

The sloping condenser surface 58 terminates in a ridge 62 which circumscribes the aspheric section 46 and the sloping condenser surface 58. The dome-shaped surface 48 of the aspheric section 46 and the sloping condenser surface 58 are both preferably a molded surface to smoothly interpolate points and preferably possess a surface quality of about ⅚×0.63 DIN 3140 and a surface tolerance of about 0.025 per DIN 7184 (dimensions in millimeters). The surface of the ridge 62 is preferably a ground surface and no polish is required. The generally planar surface of the bottom 40 is preferably a ground and polished surface preferably possessing a surface quality of about ⅝×0.4 per DIN 3140 and a surface tolerance of about 0.012 per DIN 7184 (dimensions in millimeters). The preferred optical requirements are as follows: Max internal deflect size of about 0.2 millimeters, total number of internal defects less than about 10, and a minimum spacing between defects of about 10.0 millimeters. The condenser 36 may be manufactured of any suitable material that is capable of allowing light rays to pass therethrough. Preferably, the condenser 36 is constructed from a material (i.e. borosilicate glass) sold under the trademark Pyrex to Corning Glass.

The outer mirror assembly 20, as best shown in FIGS. 9–12 and which is preferably constructed of aluminum, includes a base 66 having a threaded aperture 70 wherein the inner mirror 24 threadably connects to the outer mirror assembly 20. A pair of opposed outer mirrors 74—74 is bound to the base 66. The mirrors 74—74 may possess any suitable shape and/or geometry, such as elliptical, hyperbolic, aspherical, etc. Each outer mirror 74 includes a bottom 78 and a mirror surface 80 (i.e. a mirror reflective surface 80 for reflecting peripheral light rays). A plurality of fin members 82 are bound to the bottom 78 and function to assist in dissipating heat generated by the light 32. The support frame 14 (see FIG. 5) of the housing 12 supports the outer mirror assembly 20.

Figure 15:
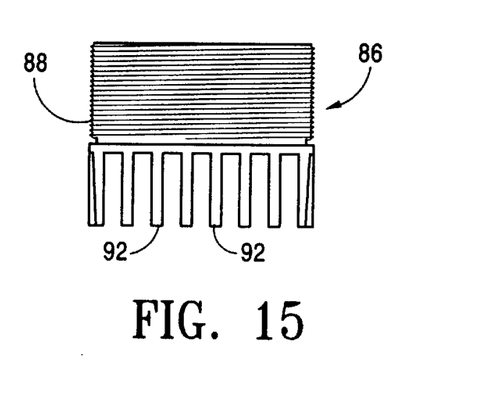
FIG. 15 is a side elevational view of the inner mirror.
Figure 16:
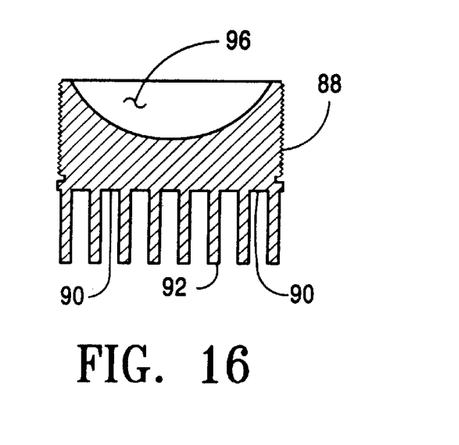
FIG. 16 is a vertical sectional view taken in direction of the arrows and along the plane of line 16—16 in FIG. 13.

The inner mirror 24 is also preferably constructed of aluminum and comprises a generally cylindrical body 86 having a threaded outer surface 88 (see FIG. 15) and a bottom 90 whereto a plurality of fin members 92 are secured and depend therefrom and function as fin members 82; that is, fin members 92 assist in dissipating heat generated by the light 32. When light 32 is illuminated, heat is absorbed by the outer mirror assembly 20 and by the inner mirror 24 and the fin members 82 and 92 respectively provide a means for removing heat from the main body of the outer mirror assembly 20 and of the inner mirror 24. The inner mirror 24 further includes a concave reflective mirror surface 96. The threaded outer surface 88 threadably engages the threaded aperture 70 of the base 66 of the outer mirror assembly 20. The distance of the light 32 from the concave reflective mirror surface 96 may be adjusted.

Figure 3:
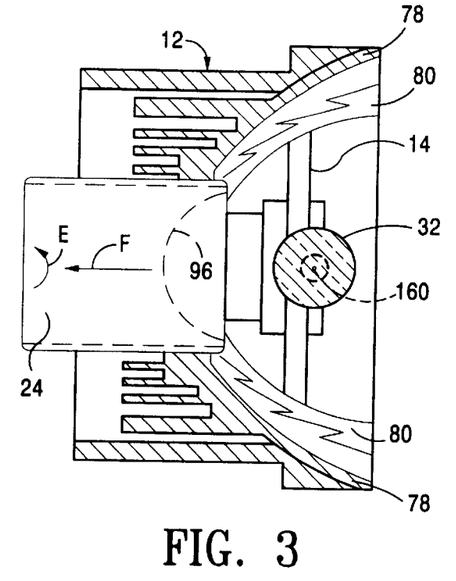
FIG. 3 is a partial vertical sectional view disclosing the outer mirror assembly in sectional form with the inner mirror threadably engaged to the outer nurror assembly and including a light mounted between the pair of opposed mirrors of the outer mirror assembly and aligned with the inner mirror.
Figure 4:
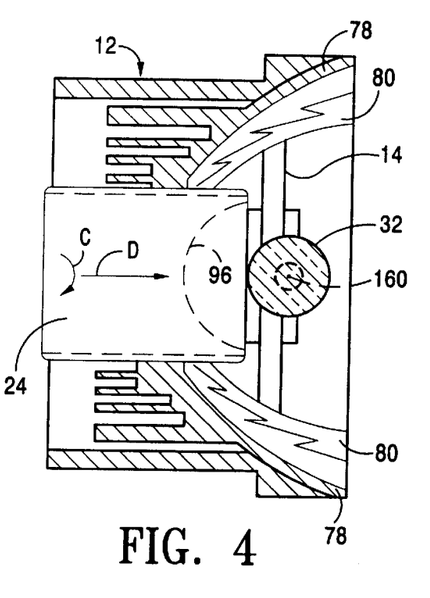
FIG. 4 is a partial vertical sectional view of the outer mirror assembly and the inner mirror of FIG. 3 after the inner mirror has been moved in closer proximity to the light from the position of FIG. 3 by having been rotated and screwed into the threaded opening of the outer mirror assembly.

As best shown in FIGS. 3 and 4, rotating the inner mirror 24 in a desired direction, such as clockwise as represented by the arrow C in FIG. 4, moves the inner mirror 24 including its associated concave reflective mirror surface 96 in direction of the arrow D in FIG. 4 and towards the light 32. Similarly and as best shown in FIG. 3, rotation of the inner mirror 24 in the opposite direction, such as counterclockwise as represented by the arrow E in FIG. 3, moves the inner mirror 24 and its associated concave reflective mirror surface 96 in direction of the arrow F and away from the light 32.

Figure 17:
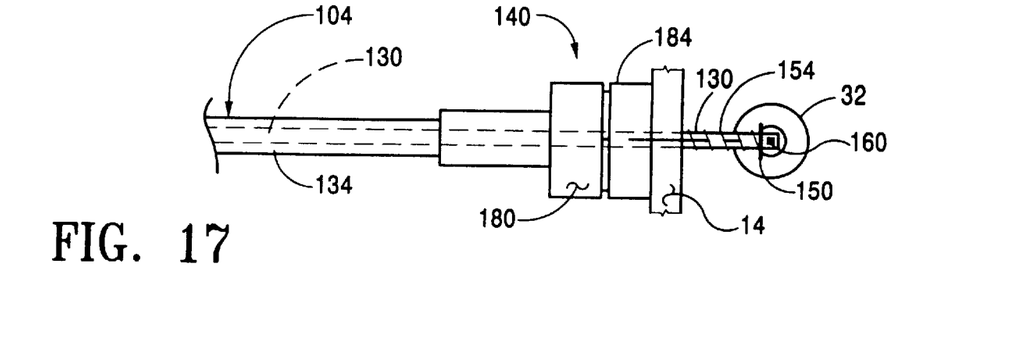
FIG. 17 is a side elevational view of the adjustment assembly for adjusting the position of the light relative to the mirror assembly, particularly the inner mirror.
Figure 18:
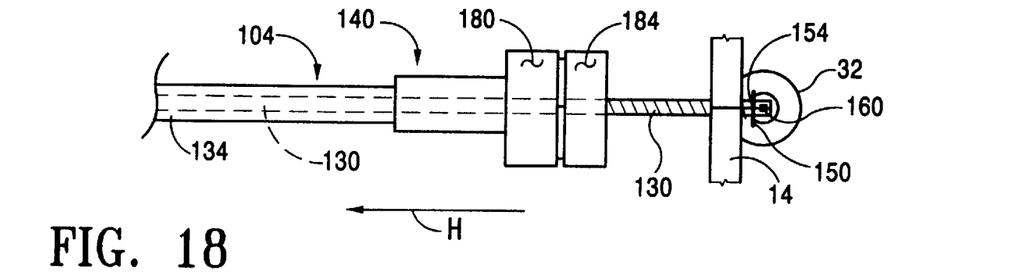
FIG. 18 is a side elevational view of the adjustment assembly after the conductive shaft which supports the light has been moved in direction of the arrow in order to collapse the spring member against a support frame of the housing supporting the mirror assembly.

The light assembly 28 includes a pair of plug assemblies 100—100, each being coupled to a power source for receiving power therefrom. The light assembly 28 also comprises a pair of cord assemblies 104—104 (one being shown in FIG. 1), and a spring supported light holder assembly, generally illustrated as 108. Each plug assembly 100 comprises a plug 110 having a plug base 112 secured to the frame support 14 and a conductor 116 extending away from the plug base 112 and partially insulated by the latter. Each cord assembly 104 comprises a conductor 130 (see FIGS. 17–20) insulated by a covering 134 and an adjustment assembly 140 disposed at one end and a plug 144 disposed at the other end and flushed against the support frame 14. Conductor 130 is in electrical engagement with conductor 116 and passes through plug 144, through the adjustment assembly 140 and through the frame support 14 to extend away therefrom (see FIG. 17). A pair of washers 150—150 is conveniently mounted to opposed ends (see FIG. 5) of the conductor 130 and a spring member 154 is disposed around each end of the conductor 130 between the washer 150 and the support frame 14. The spring members 154—154 are sandwiched between the support frame 14 and the washers 150—150.

Figure 5:
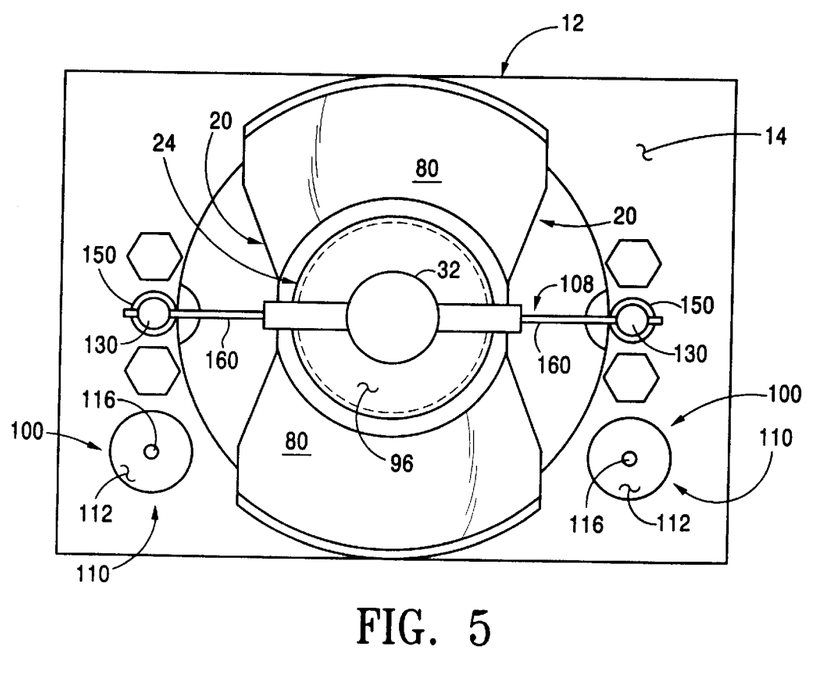
FIG. 5 is an end elevational view of the mirror assembly of FIG. 1 after the condenser lens has been removed off of the outer mirror assembly.

The light holder assembly 108 comprises the light 32 and a pair of conductors 160—160 connecting to and electrically engaging the light 32 to illuminate the same when current is passed through the conductors 160—160. As best shown in FIG. 5, the conductors 160—160 (i.e. the ends of the conductors 160 not engaged to the light 32) electrically engage opposed ends of the conductor 130.

The adjustment assembly 140 includes a plug 180 bound and/or affixed to the conductor 130 such that when the plug 180 is grasped and moved, the conductor 130 also moves. The adjustment assembly 140 further includes an internally threaded adjustment plug 184 which is rotatably and threadably mounted to the conductor 130 between the plug 180 and the support frame 14. As best shown in FIGS. 17–20, the portion of the conductor 130 extending beyond the plug 180 and slideably through the support frame 14 is threaded.

Figure 19:
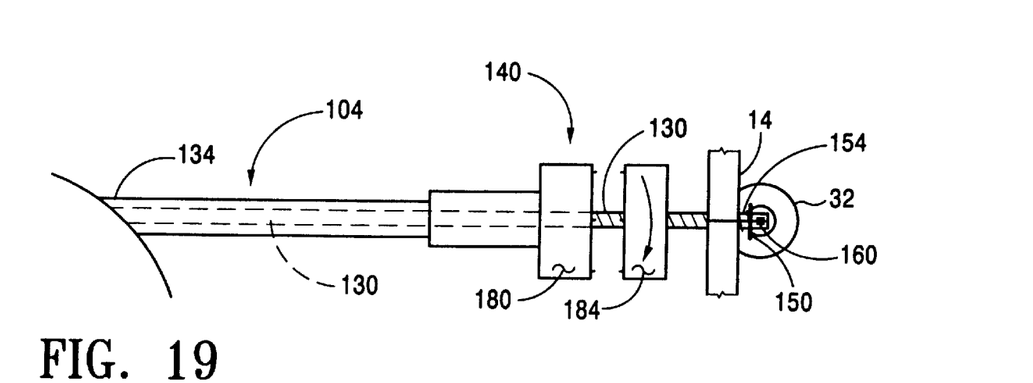
FIG. 19 is a side elevational view of the adjustment assembly of FIG. 18 after the adjustment screw has been rotated clockwise to move the same towards the support frame.
Figure 20:
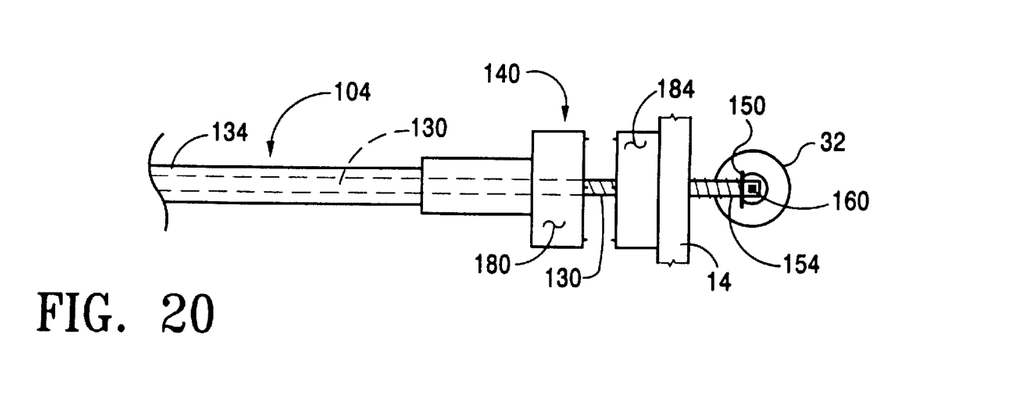
FIG. 20 is a side elevational view of the adjustment assembly after releasing the shaft, causing the adjustment screw to be flushed against the frame and to lower the position of the light relative to the mirror assembly, particularly the inner mirror.

The position of the light 32 may be adjusted relative to the support frame 14, as well as relative to the mirror assembly 10 particularly the inner mirror 24. As best shown in FIGS. 17–20, the position of the light 32 relative to the mirror assembly 10 (particularly relative to the inner mirror 24) may be adjusted by grasping the plug 180 and pulling the plug in direction of the arrow H of FIG. 18. Movement of the plug 180 in direction of the arrow H causes the conductor 130 along with the adjustment plug 184 to also move in the direction of the arrow H. When conductor 130 moves in direction of the arrow H, the associated washer 150 also moves in direction of the arrow H and towards the support frame 14. As the washer 150 is being moved by the conductor 130 towards the support frame 14, the spring member 154 therebetween compresses. Obviously and because conductor 160 passes through an aperture (not shown) in the end of conductor 130 (see FIG. 5) when conductor 130 moves, the conductor(s) 160 supported by conductor 130 (including the light 32) also move. After the plug 150 and the associated adjustment plug 184 has been placed in the position of FIG. 18, which position essentially fully compresses the spring 154 and releases the adjustment plug 184 from frictional engagement with the support frame 14, the adjustment plug 184 and is rotated in a desired direction which causes the adjustment plug 184 to move away from the plug 180 and the support frame 14. As shown in FIG. 19, such movement could be a clockwise movement by rotating the adjustment plug 184 clockwise or in direction of the arrow in FIG. 19. After the adjustment plug 184 has moved a desired distance along the conductor 130 and towards the support frame 14, the adjustment plug 180 is released, where upon the biasing force of the spring 154 against the washer 150 moves the conductor 130, as well as the conductor 160 connected to the end of the conductor 130, in a direction opposite to the direction of the arrow in FIG. 18. Such movement continues until the adjustment plug 184 is flushed against the support frame 14. By rotating the adjustment plug 184 away from the plug 180, the effective length of the conductor 130 from the support frame 14 is decreased by the amount or distance that the adjustment plug 184 has been rotated away from the plug 180. Decreasing the effective length of the conductor 130 from the support frame 14 causes the conductor 160, which is secured to the end of conductor 130 along with the light 32 supported by the conductor 160, to be in closer proximity to the support frame 14, as well as to the inner mirror 24. Obviously, the procedure may be reversed in order to raise or extend the light 32 away from the support frame 14 and the inner mirror 24. Such reversal would be accomplished by grasping the plug 180 and pulling the plug 180 in direction of the arrow H such that the frictional engagement of the adjustment plug 184 against the support frame 114 is released, and the adjustment plug 184 is then free to be rotated in the opposite direction that was previously rotated, such as in a counter clockwise direction or in a direction opposite to the arrow in FIG. 19.

Continuing to refer in detail now to the drawings for operation of the invention, the mirror assembly 10 and the light assembly 28, all engaged to and supported by the housing 12 as previously indicated, are disposed in a projector machine, such as that disclosed in U.S. Pat. No. 5,568,279 to Hinman et al. The condenser 36 is then disposed against the mirror housing 12 as shown in FIG. 1. The mirror assembly 10 functions to reflect light, gather/capture the reflected light, and the condenser 36 functions to refocus the gathered/captured light to produce a rectangular image by refocusing or aligning the captured/gathered light to match the focal point of the aspheric field. After the mirror assembly 10, the light assembly 28, and the condenser 36 have been disposed in the desired apparatus, the light 32 is turned on by any suitable switch (not shown) which would allow current to pass through the two conductors 116—116, through the two conductors 130—130 and through the two conductors 160—160 to illuminate the light 32.

The position of the light 32 with respect to the mirror assembly 10 may be adjusted by the adjustment assemblies 140—140 all in accordance with the procedure as stated above. Separately from adjusting the light assembly 28 with respect to the mirror assembly 10, the distance of the inner mirror 24 from the light 32 may be adjusted by rotating the inner mirror either clockwise if the associated concave reflective mirror surface 96 is to be moved closer to light member 32, or counter clockwise (or in direction of the arrow E in FIG. 3) if the concave reflective mirror surface 96 is to be moved further away from the light 32. The object is to optimize the reflection of the light such that a clear rectangular image is produced. If the reflective mirror surface 96 is too close to the light 32, then an insufficient amount of peripheral light rays are being reflected off of the mirror reflective surfaces 80—80, causing a majority of the light rays to be reflected off of the reflective mirror surface 96 of the inner mirror 24. This would cause the image not to be sharp around the borders including the corner fields. If the reflective mirror surface 96 is too far from the light 32, then the mirror reflective surfaces 80—80 are receiving a majority of the peripheral light rays and the concave reflective mirror surface 96 is receiving an insufficient amount of light rays, causing the center of the rectangular image to be somewhat obscure and not sharp.

Figure 21:
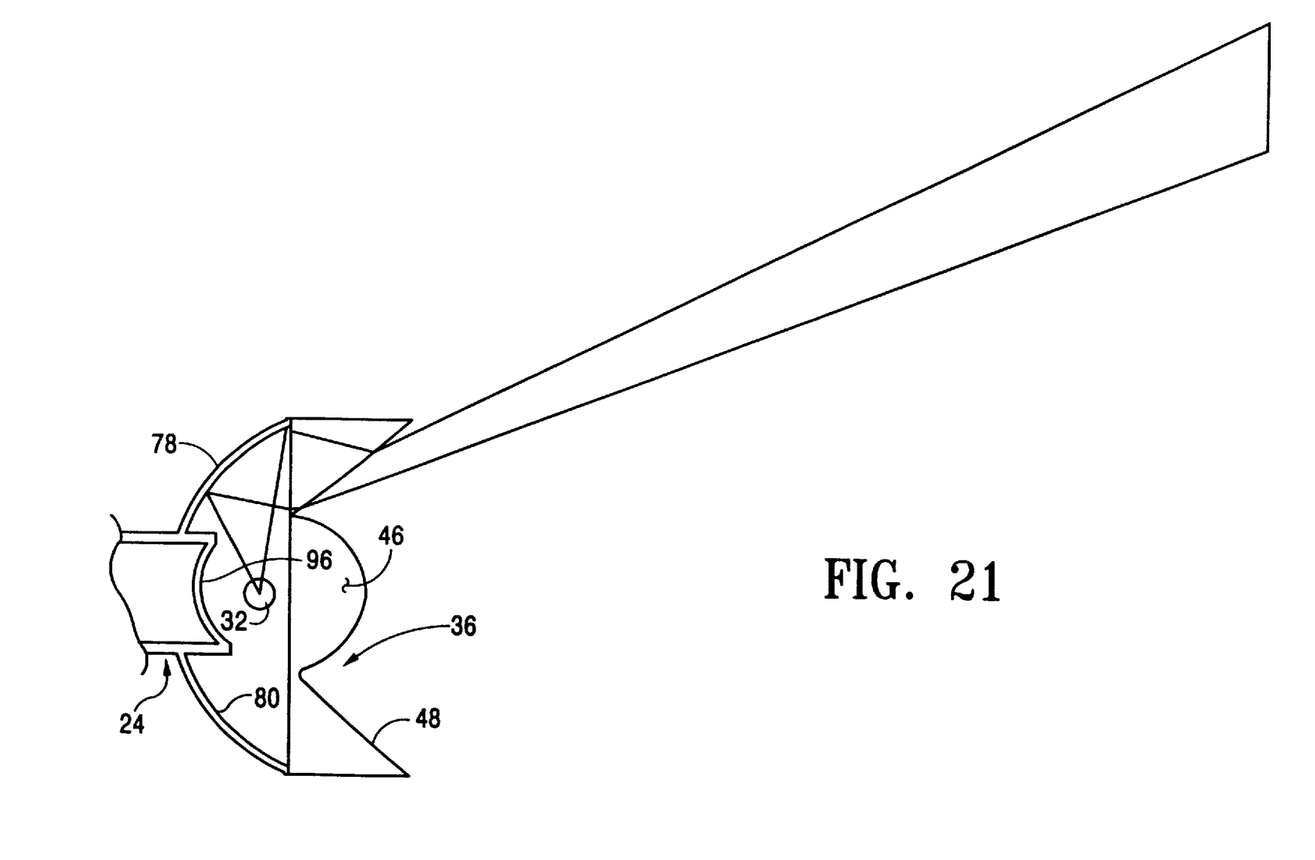
FIG. 21 is a schematic view of light rays emanating from a light source and reflecting off one of the opposed outer mirrors, and passing through the sloping surface of the condenser, illustrating capturing of light rays from a corner field which by-passed the inner mirror.
Figure 22:
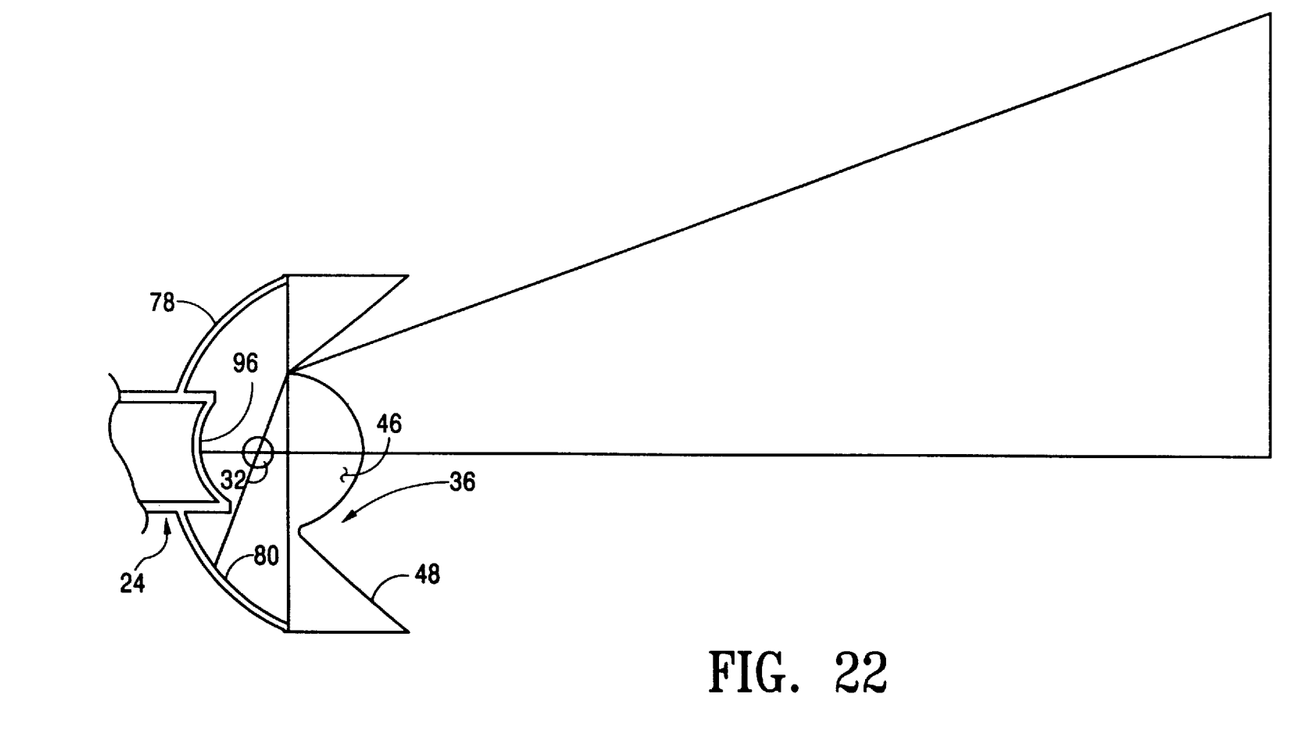
FIG. 22 is a schematic view illustrating light rays emanating from a light and passing through the aspherical surface section (central field) of the condenser.
Figure 23:
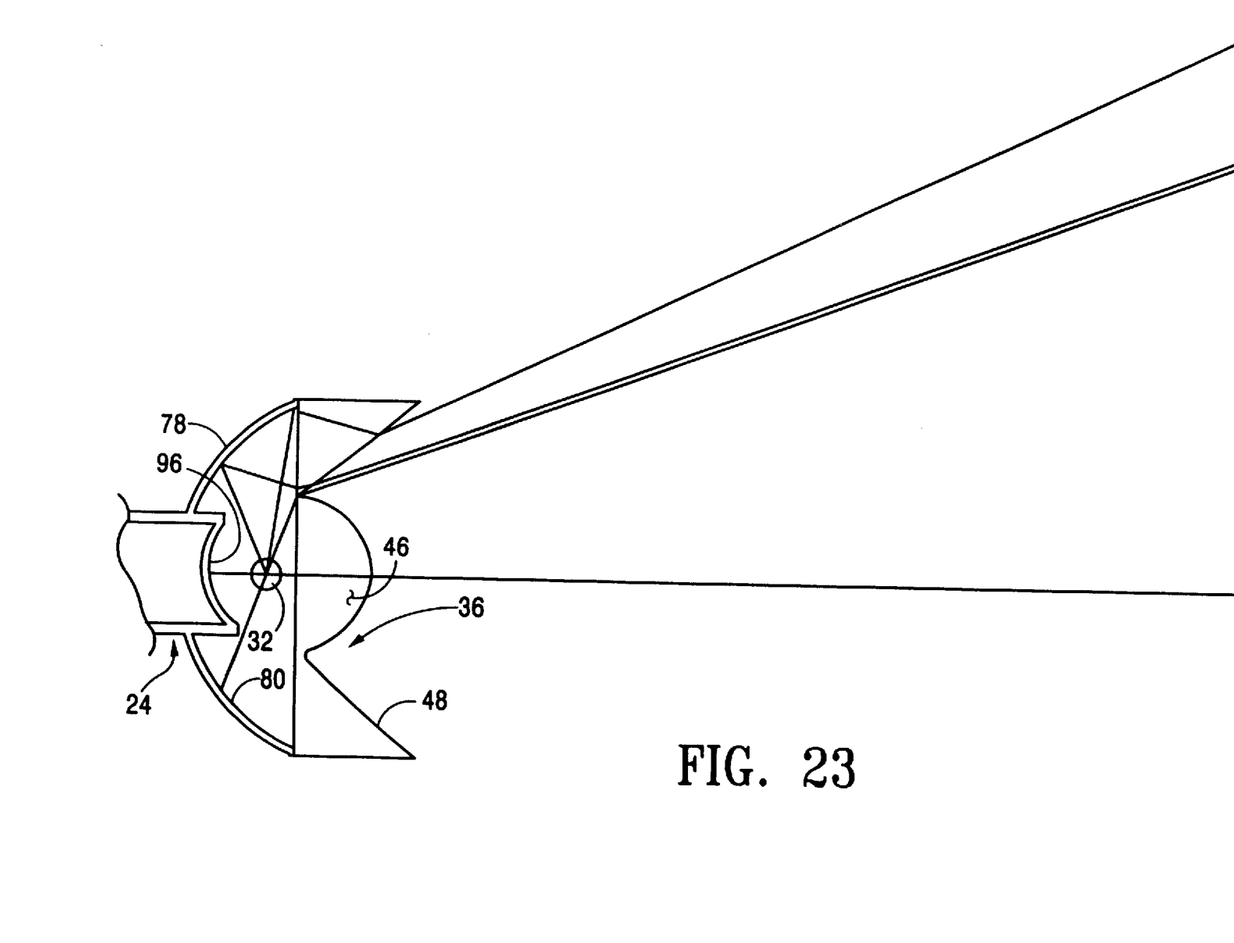
FIG. 23 is a schematic view of light rays emanating from a light source and reflecting off both one of the opposed outer mirrors and the inner mirror for passage through the condenser in order to gather or capture peripheral light and to refocus or align this captured peripheral light to match the focal point of the aspheric field.
Figure 24:
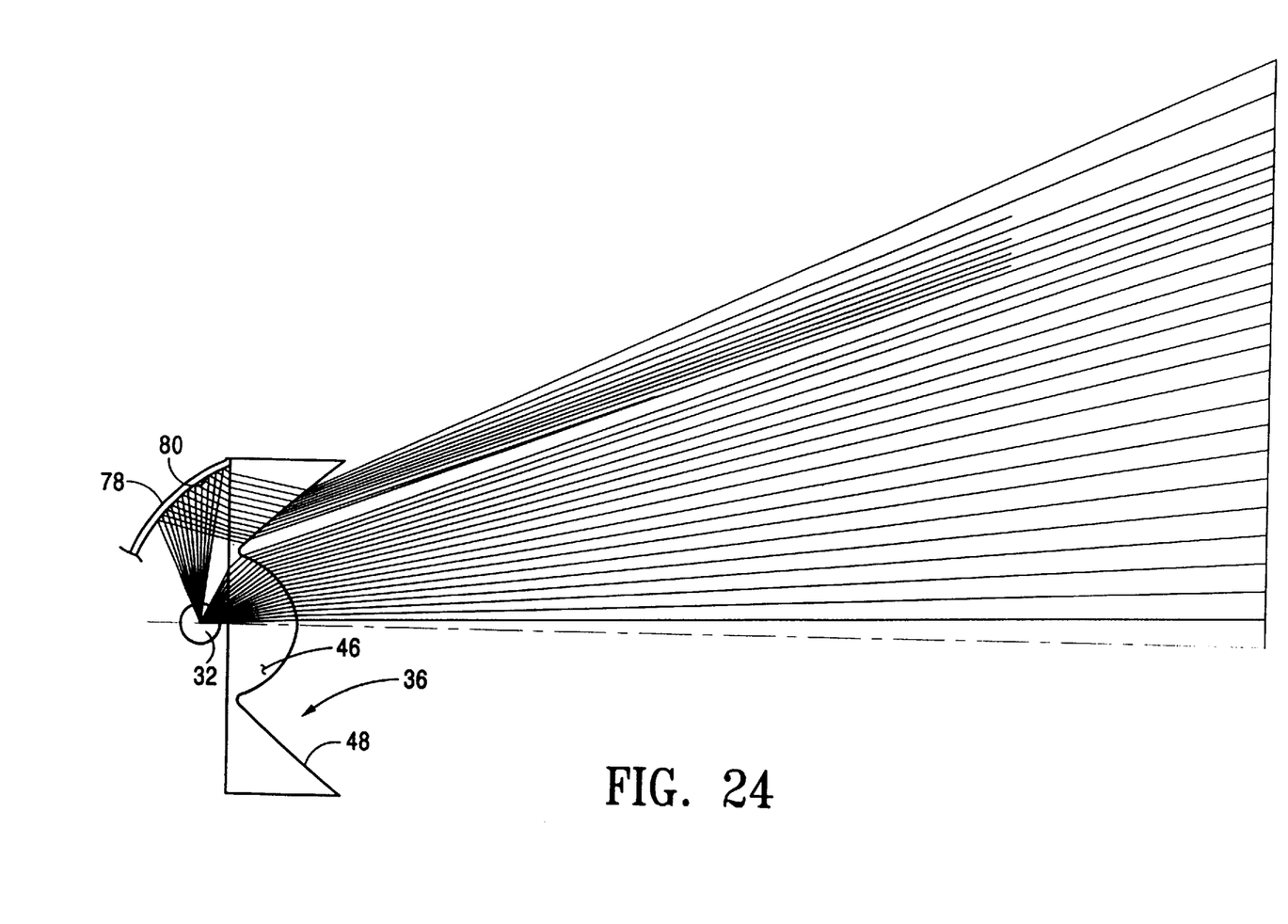
FIG. 24 is a schematic view of light rays emanating from a light source with some of the light rays passing directly through the aspherical section of the condenser and with the remaining shown light rays reflecting off one of the opposed ellipsoidal mirrors and passing through the condenser.

Referring now to FIG. 21, there is seen light rays emanating from the light 32 and reflecting off of one of the mirror reflective surfaces 80 of one of the mirrors 74, and the passing of the reflected light rays through the dome-shaped surface 48 of the condenser 36, all illustrating the capturing of light. rays which did not reflect off the concave reflective mirror surface 96 of the inner mirror 24. These light rays are peripheral light ray which by-pass the inner mirror 24 and assist in illuminating the corner field of the rectangular image. Referring now to FIG. 22, there is seen light rays emanating from the light 32 and passing through the aspheric section 46 of the condenser 36 to illuminate the central field of the rectangular image. Some of the light rays in FIG. 22 pass directly from the light 32 through the aspheric section 46 and other light rays are reflected initially off of the reflective mirror surface 96 before passing through the aspheric section 46. FIG. 23 is a schematic view of light rays emanating from the light 32 and reflecting off both one of the mirror reflective surface 80 of the mirror 74 and off of the reflective mirror surface 96 and the inner mirror 24 for passage through the condenser 36 in order to gather or capture peripheral light (i.e. light which is being reflected off the mirror reflective surfaces 80), and to refocus or align this captured peripheral light with the condenser 36 to match the focal point of the aspherical field. Referring now to FIG. 24 there is seen a schematic view of the light rays emanating from the light 32, with some of the light rays passing directly through the aspheric section 46 of the condenser 36, and with the remaining shown light rays reflecting off of one of the mirror reflective surfaces 80 of one of the mirrors 74 and passing through the condenser 36 (more specifically passing through the dome-shaped surface 48 of the condenser 36).

Thus, by the practice of the present invention, there is provided a method for capturing peripheral light rays from light 32 which includes disposing the condenser 36 against the housing 12 supporting the mirror assembly 10, with the light assembly 28 supported by the housing 12 and including the light 32. The light 32 is illuminated to produce light rays, a portion of which directly passes through the aspheric section 46 of the condenser 36 without being reflected, leaving a first residual light ray portion and a second residual light ray portion. The first residual light ray portion is reflected (e.g. reflected off of the concave reflective mirror surface 96) for passage through the aspheric section 46 of the condenser 36 and the second residual light ray portion is reflected (e.g. reflected off of the mirror reflective surfaces 80—80 of the mirrors 74—74) for passage through the condenser 36, preferably through the dome-shaped surface 48 and the condenser 36.

Thus, while the present invention has been described herein with reference to particular embodiments thereof, a latitude of modification, various changes and substitutions are intended in the foregoing disclosure, and it will be appreciated that in some instances some features of the invention will be employed without a corresponding use of other features without department from the scope of the invention as set forth.

I claim:

1. A method for capturing peripheral light rays from a light source comprising the steps of:
   a) disposing a condenser against a housing supporting a mirror assembly with a light assembly supported by the housing and including a light member;
   b) illuminating the light member to produce light rays, a portion of which directly passes through an aspheric section of the condenser without being reflected, leaving a first residual light ray portion and a second residual light ray portion;
   c) reflecting the first residual light ray portion for passage through the aspheric section of the condenser; and
   d) reflecting the second residual light ray portion for passage through the condenser.

2. The method of claim 1 wherein said reflecting step (d) further includes reflecting the second residual light ray portion for passage through a sloping condenser surface of the condenser.

3. The method of claim 1 additionally comprising adjusting a distance of the light member from the mirror assembly.

4. The method of claim 2 additionally comprising adjusting a distance of the light member from the mirror assembly.

5. The method of claim 1 therein said mirror assembly includes an outer mirror assembly and an inner mirror engaged to the outer mirror assembly, and said method further comprises adjusting a distance of the inner mirror from the light member.

6. The method of claim 5 wherein said adjusting comprises rotating the inner mirror relative to the outer mirror assembly.

* * * * *